United States Patent
Barton et al.

[15] 3,653,019
[45] Mar. 28, 1972

[54] SIGNAL MONITORING SYSTEM

[72] Inventors: Sterling C. Barton; Fred H. Sawada, both of Scotia, N.Y.

[73] Assignee: General Electric Company

[22] Filed: July 28, 1970

[21] Appl. No.: 58,902

[52] U.S. Cl. .................................340/248 P, 325/478
[51] Int. Cl. .................................................G08b 21/00
[58] Field of Search.............340/248 P, 248 R; 325/478; 328/167, 165

[56] References Cited

UNITED STATES PATENTS

| | | | |
|---|---|---|---|
| 2,991,458 | 7/1961 | Cooke | 340/248 P |
| 3,325,738 | 6/1967 | Busby | 325/478 |
| 3,437,937 | 4/1969 | Warfield | 325/478 |

Primary Examiner—Thomas B. Habecker
Attorney—William C. Crutcher, Frank L. Neuhauser, Oscar B. Waddell and Joseph B. Forman

[57] ABSTRACT

A signal processing system for monitoring the brush arcing potential at the slip rings of a generator supplied through the brushes with a field potential having recurring high-energy noise spikes in the same frequency band as the signal to be monitored, and to give an alarm when the brush arcing potential exceeds a certain critical value. The system eliminates the noise spikes by gating the signal for a preset time at a predetermined time after the occurrence of a noise spike.

18 Claims, 5 Drawing Figures

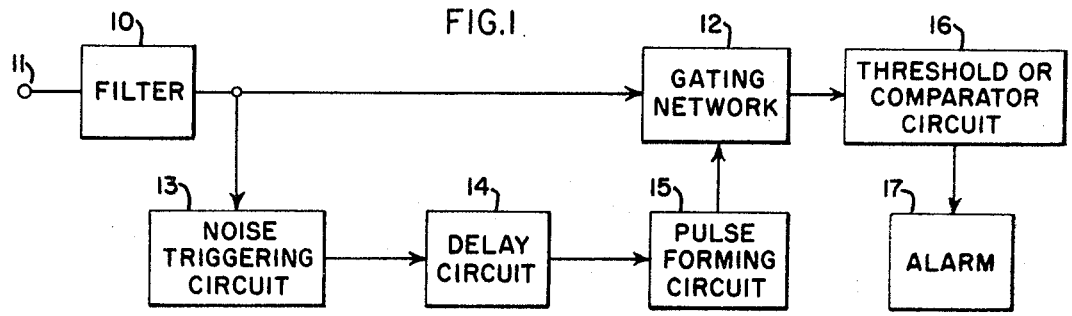
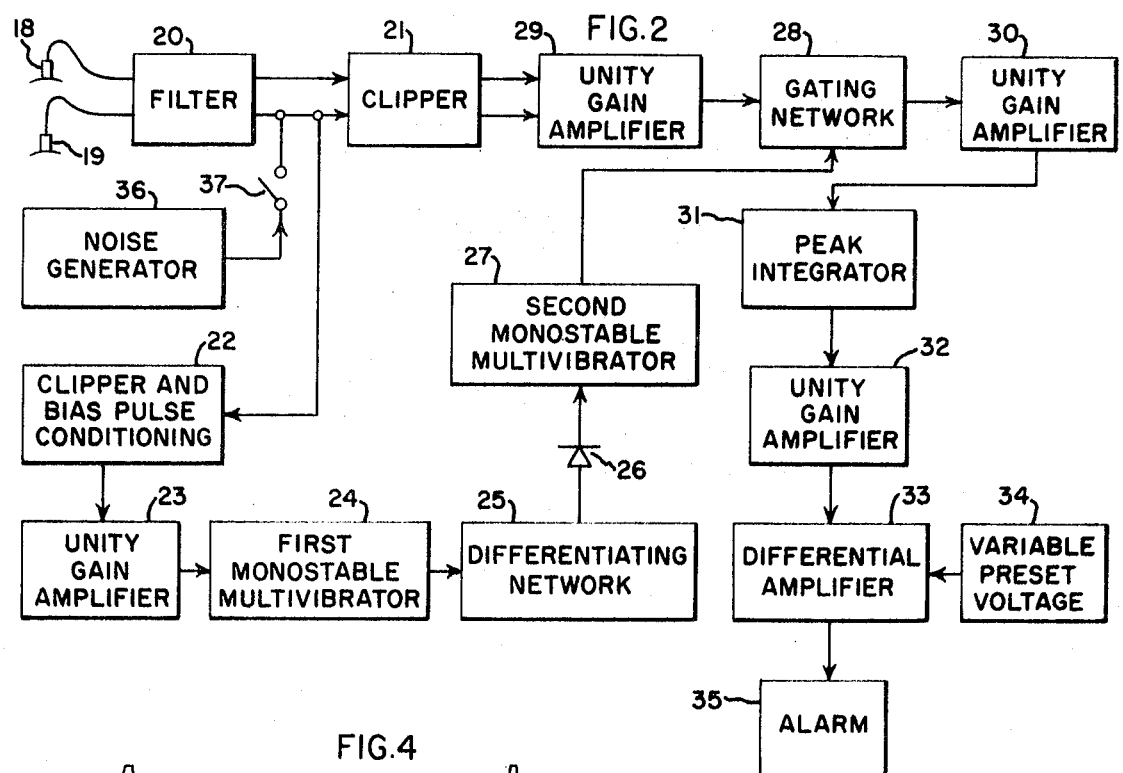
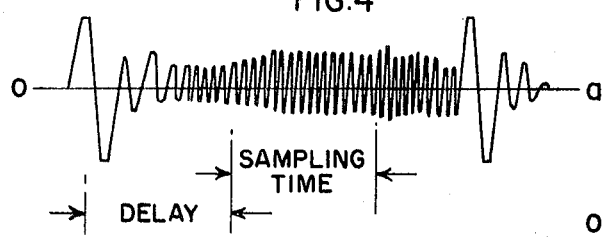
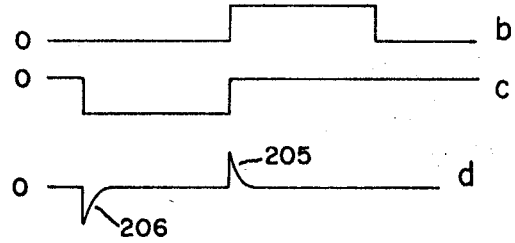

INVENTORS:
STERLING C. BARTON,
FRED H. SAWADA,

BY W.C. Crutcher

THEIR ATTORNEY.

SIGNAL MONITORING SYSTEM

BACKGROUND OF THE INVENTION

1. Field of the Invention

This invention relates to a circuit for monitoring the arcing potential of a generator brush, and more particularly, to a circuit for monitoring the generator brush arcing potential wherein the excitation voltage supplied to the brushes contains recurring noise spikes created by solid state switching and where these noise spikes are in the same frequency band as the brush arcing potential.

2. Description of the Prior Art

Heretofore, there was no suitable known means to monitor the brush arcing potential in a generator wherein the excitation voltage supplied to the brushes contained high-energy noise spikes in the same frequency band as the brush arcing potential which was to be monitored. Without a means to monitor the brush arcing potential, excessive arcing unexpectedly occurs causing severe damage to the brush holder riggings and a rapid deterioration of the collector slip rings if proper action to avoid or remedy the excessive arcing is not taken promptly. Such severe damage results in considerable down time for repair of equipment with considerable cost for additional parts and with a loss of revenue for the power company due to the loss of electrical power sales. Also, by providing a means to monitor the condition of the generator brushes and to indicate a general deteriorating condition, the equipment may be taken out of service for replacement of brushes at times other than that of peak power demand, since unexpected failure of equipment at periods of peak power demand contributes to the occurrence of widespread power failures better known as "blackouts."

SUMMARY OF THE INVENTION

It is a principal object of this invention to provide an apparatus for monitoring brush arcing potential even in the presence of recurring noise spikes in the same frequency band as the signal to be monitored, and to provide an apparatus which will actuate an alarm when the brush arcing potential exceeds a certain predetermined critical value which may vary with the type of brush used.

Another object of this invention is to provide an apparatus which can be used to deenergized the generator system is response to a degenerating brush arcing condition before excessive arcing and resulting damage occur.

Another object of this invention is to provide a signal monitoring system in which a delayed sampling interval can be initiated by a noise spike in the same frequency band as the signal to be monitored.

A further object of this invention is to provide an apparatus which can be used to monitor brush arcing potential whether or not the monitor signal contains high-energy noise spikes.

A still further object of this invention is to provide a monitoring and detecting system which is inexpensive to manufacture and which still provides a reliable alarm before excessive damage occurs to the generator brush riggings and collector slip rings.

The instant invention makes use of the discovery that brush contact deteriorates rapidly and arcing rapidly becomes excessive once a certain critical brush-arcing potential is passed.

Briefly stated, in accordance with one aspect of the invention, a composite input signal containing the information signal to be monitored and recurring noise spikes and which may also contain an undesired low-frequency component, may be fed through a high pass filtering circuit to remove any low-frequency component of the input signal. The resulting output signal of the filter, if used, is fed to both a gating network and a noise triggering circuit which produces an output trigger pulse only in response to a noise spike. The trigger pulse produced in response to a noise spike is delayed and then used to trigger a pulse-forming circuit whose output is applied to a gating network as the enabling signal for the gating network. The output of the gating network, which is the filtered input signal monitored for a preset interval at a predetermined time after the occurrence of a noise spike, is fed to a threshold circuit which produces an output only when the input exceeds a predetermined value, and which output of the threshold circuit may be used to actuate an alarm or deenergize the dynamoelectric system.

BRIEF DESCRIPTION OF THE DRAWINGS

While the specification concludes with claims particularly pointing out and distinctly claiming the subject matter which we regard as our invention, it is believed the invention will be better understood from the following description taken in connection with the accompanying drawings in which:

FIG. 1 is a simplified block diagram of the invention;

FIG. 2 is a block diagram of a preferred arrangement of the device in accordance with the invention;

FIG. 4 is a drawing of electrical waveshapes at selected points in the circuit; and FIG. 5 is a drawing of a typical composite input signal.

DESCRIPTION OF THE PREFERRED EMBODIMENTS

Figure 3:
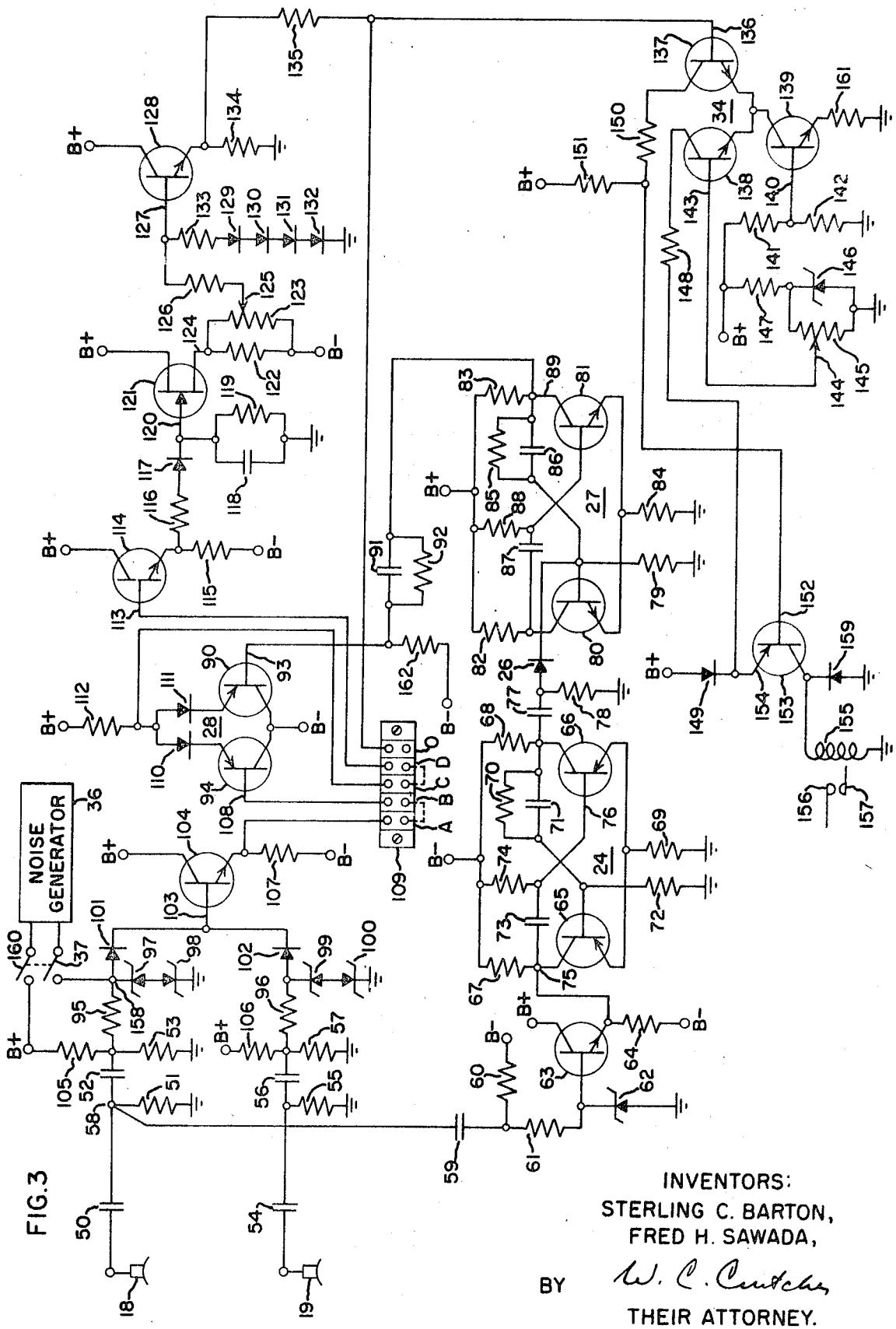
FIG. 3 is a schematic diagram of the device.

Referring now, more particularly, to FIG. 1 to illustrate the principles of the invention, there is shown a simplified block diagram of the invention wherein a filter circuit 10 receives at its input 11 a composite waveform, as illustrated in FIG. 5, which composite waveform may contain a DC component, a low power frequency ripple component, recurring high-energy noise spikes, and an information signal to be monitored, which information signal is in the same frequency band as the noise spikes. The output of the filter circuit 10 is fed to a gating network 12 and to a noise triggering circuit 13. The noise triggering circuit 13 may be provided with biasing and clipping means to ensure that a trigger pulse is formed only in response to a high-energy noisy spike, and not in response to the information signal. The output trigger pulse of noise triggering circuit 13 is fed to a suitable delay circuit 14 which may consist of a monostable multivibrator wherein the pulse forming circuit 15 is triggered on the trailing edge of the monostable multivibrator, a delay line, or any other suitable well-known delay circuit. A pulse forming circuit 15 is then triggered by the delayed noise trigger pulse, and the output of the pulse forming circuit is applied to gating network 12 to gate the information signal for a preset time at a predetermined time after a noise spike. The sampled output of the gating network 12 is then fed to a threshold circuit 16 which in turn activates an alarm 17 or other suitable safety circuit, such as a system deenergization circuit, when the amplitude of the sampled signal exceeds a predetermined value.

Referring now to FIG. 2, there is shown a block diagram of a preferred embodiment of the invention, wherein a composite signal, as shown in FIG. 5, containing brush arcing potential, power frequency ripple due to imperfect filtering of a rectified AC supply voltage, and substantially periodic high-energy noise spikes created by switching of the solid state rectifiers and being in the same frequency band as the brush arcing potential is picked up from both the positive brush 18 and the negative brush 19 of the generator. These signals are fed through a high pass filter 20 in order to remove any undesired low frequency component which may be present at the input due to imperfect filtering at the output of solid state rectifiers which produce the generator field excitation voltage. Both of these filtered inputs are fed to a clipping circuit 21 which limits the positive and negative excursions of the signal in order to protect the circuitry following the clipper circuit. One of the filtered inputs is also fed to a clipper and bias pulse conditioning circuit 22 which negatively biases the incoming signal, removes the brush arcing potential, and passes only the positive noise spikes which are limited in amplitude. The output of the clipper and bias pulse conditioning circuit 22 is then fed to a unity gain amplifier 23 which in turn triggers a first monostable multivibrator 24. The output of the first monostable multivibrator 24 is fed to a differentiating network 25, and the output of differentiating network 25 is then passed through a rectifying means 26 poled so as to cause a second monostable multivibrator 27 to be triggered on the trailing edge of the pulse produced by the first monostable multivibrator 24. The output pulse of the second monostable multivibrator 27 is applied to a gating network 28 which gates a signal produced by unity gain amplifier 29 which instantaneously passes the stronger output signal of clipper 21 due to an arrangement of a pair of diodes on the input side of the unity gain amplifier 29. The output of the gating network 28 is then fed through a unity gain amplifier 30 to a peak integrating circuit 31 to produce a varying DC output signal proportional to the gated information signal's peak amplitude. The varying DC output signal of the peak integrator 31 is passed through a unity gain amplifier 32 to a differential amplifier 33. A second input to the differential amplifier 33 is a preset DC voltage obtained from an adjustable regulated supply 34. The differential amplifier 33 produces an output to activate an alarm 35 only when the gated peak integrated input signal to the differential amplifier exceeds the preset input voltage. A noise generator 36 may be connected to one of the inputs of the clipper circuit 21 through a switch 37 in order to test the functioning of a portion of the monitor and the alarm circuit.

FIG. 3 shows a detailed schematic diagram of the block diagram shown in FIG. 2 wherein all points marked B+ are connected by a common bus line, not shown, to a positive regulated DC voltage supply, and all points marked B— are connected by a common bus line, not shown, to a negative regulated DC supply voltage. The composite input signal from the positive brush 18 is fed through a high pass filter composed of capacitor 50, resistor 51, capacitor 52 and resistor 53, and the composite signal from the negative brush 19 is fed through a high pass filter composed of capacitor 54, resistor 55, capacitor 56 and resistor 57. A portion of the filtered input signal is taken from point 58 and fed through a capacitor 59 to the junction of resistors 60 and 61 which form a negatively biased clipper circuit in conjunction with zener diode 62. The other terminal of resistor 61 is connected to the — bus line, and the other terminal of resistor 61 is connected to the cathode of zener diode 62 with its anode connected to ground. The negatively biased clipped output is fed to an emitter-follower composed of transistor 63 and resistor 64 connected between the B+ and B— bus lines. The output of the emitter-follower developed across resistor 64 is a positive spike in response to the occurrence of each positive noise spike and is used to trigger a conventional and well known monostable multivibrator 24 composed of transistors 65 and 66 with their collectors connected to the B— bus line through resistors 67 and 68 respectively and the emitters of transistors 65 and 66 connected in common through resistor 69 to ground. The collector signal of transistor 66 is coupled to the base of transistor 65 through the parallel RC network composed of resistor 70 and capacitor 71, and the base of transistor 65 is connected to ground through resistor 72. The collector signal of transistor 65 is coupled to the base of transistor 66 through capacitor 73, and the base of transistor 66 is connected to the B— bus line through resistor 74. The positive trigger pulse is applied directly to collector 75 of transistor 65 and through capacitor 73 to the base 76 of transistor 66. The negative output pulse of the monostable multivibrator 24 has its pulse width substantially determined by the RC time constant of resistor 74 and capacitor 73. The output of the first monostable multivibrator 24 is fed to a differentiating circuit composed of capacitor 77 and resistor 78 which is then fed through a diode 26 which passes only the positive going pulse created by differentiation of the trailing edge of the output pulse of the monostable multivibrator 24. The trailing edge spike is developed across resistor 79 which is then used to trigger a second monostable multivibrator 27 containing transistors 80 and 81 with their respective collectors connected to the B+ bus line through resistors 82 and 83 respectively, and their emitters connected in common through resistor 84 to ground. The collector signal of transistor 81 is coupled to the base of transistor 80 through the parallel RC network of resistor 85 and capacitor 86, and the base of transistor 80 is connected to ground through resistor 79. The collector signal of transistor 80 is coupled to the base of transistor 81 through capacitor 87, and the base of transistor 81 is connected to the B+ bus line through resistor 88. The spike developed across resistor 79 is felt directly on the base of the transistor 80 and through capacitor 86 on the collector 89 and transistor 81. The pulse of the second monostable multivibrator has its pulse width determined substantially by the time constant of the RC network composed of resistor 88 and capacitor 87. The positive going pulse of the second monostable multivibrator 27 is applied to the base of transistor 90 through a parallel RC isolation network composed of capacitor 91 and resistor 92. When a positive pulse is applied to the base 93 of transistor 90, transistor 90 becomes nonconductive and discontinues to short transistor 94.

The filtered input signals developed across resistors 53 and 57 are applied through resistors 95 and 96, respectively, to clipping circuits composed of pairs of oppositely poled series connected zener diodes 97, 98 and 99, 100, respectively. These filtered and clipped signals are then fed through slightly forward biased diodes 101 and 102 to the base 103 of transistor 104. The diodes 101 and 102 are slightly forward biased through resistors 95, 105 and 96, 106, respectively, from the B+ supply bus line. Transistor 104 is connected in an emitter-follower configuration between the B+ and B— bus lines with the output of the emitter-follower being developed across resistor 107 and being fed to the base 108 of transistor 94 through the jumpered A and B terminals of terminal board 109. Terminal board 109 is used to provide versatility in order to allow the monitoring circuit to be used in a system in which high-energy noise spikes are not present. Diodes 110 and 111 are used to protect transistors 94 and 90 respectively from switching spikes. The output of the gating circuit 28 is produced across resistor 112 when a positive pulse is present on the base 93 of transistor 90, and the output is applied to the base 113 of transistor 114 through jumpered terminals C and D of terminal board 109. Transistor 114 is connected in an emitter-follower configuration in which the output is developed across resistor 115 and is fed through resistor 116 to a peak integrating circuit composed of rectifier 117, capacitor 118 and resistor 119. The output of the peak integrating circuit is applied to the gate 120 of field effect transistor 121 which is connected in a source follower configuration. The output of the source follower circuit is developed across resistor 122 and potentiometer 123 connected in parallel between the source 124 of the field effect transistor 121 and the B— bus line. The output of the source follower is taken from wiper arm 125 of potentiometer 123 which is then fed through resistor 126 to the base 127 of transistor 128 which is connected in an emitter-follower configuration. Diodes 129, 130, 131 and 132 are forward biased and connected in series with the resistor 133 between the base 127 of transistor 128 and ground in order to compensate for DC shifts due to changes in thermally generated collector current (Ico) in the transistor due to temperature variations. The output of transistor 128 is developed across resistor 134 and is fed through an isolation resistor 135 to an output terminal 0 on terminal board 109 and to the base 136 of transistor 137 which is connected with transistor 138 in a differential amplifier configuration. The emitter-collector circuit of transistor 139 and emitter-resistor 161 are connected in series with the parallel emitter-collector circuits of both transistors 137 and 138, with the base 140 of transistor 139 connected to a constant potential at the junction of resistors 141 and 142 which form a voltage divider circuit between B+ and ground and which thereby produce a constant bias on transistor 139 to produce a constant current in the differential amplifier 34. The base 143 of transistor 138 is connected to a constant DC potential through wiper arm 144 of potentiometer 145 which is in turn connected across zener diode 146, and the parallel combination of zener diode 146 and potentiometer 145 is connected in series with resistor 147 to the B+ bus line. The collector of transistor 138 is connected to the B+ bus line through resistor 148 and protective diode 149, and the collector of transistor 137 is connected to the B+ bus line through resistors 150 and 151, and the output signal of the differential amplifier is developed across resistor 151 and fed to the base 152 of transistor 153. Diode 149 is connected between emitter 154 of transistor 153 and the B+ bus line in order to provide biasing for transistors 153. A relay coil 155 having relay contacts 156 and 157 which are used to actuate an alarm or deenergize the system upon energization of the relay coil 155 is connected between the collector 158 of transistor 153 and ground with a protective diode 159 in parallel in order to prevent negative spikes produced in the relay coil 155 from damaging transistor 153.

A noise generator 36 may be used to test the functioning of the monitoring system, except the gating and gating control circuits in the monitoring system, by closing ganged switches 37 and 160. When the contacts of switch 160 are closed, a positive voltage from the B+ bus line is applied to the noise generator which can be used to activate any well known noise generator, as for example, a circuit which would amplify the noise generated by a zener diode biased near the point of curvature on its characteristic curve. The output of the noise generator is applied to the anode of diode 101 through the closed switch contacts of switch 37.

As mentioned above, the purpose of terminal board 109 is to provide versatility in the use of the monitoring and alarm circuit. It may be noted at this point that if the jumpers between terminals A and B and the jumper between terminals C and D are removed, and the terminals A and D are jumpered, the gating circuitry is completely bypassed thereby enabling the use of the monitoring circuit in a system in which the high energy noise spikes are not present. It may also be noted at this point that terminal 0 on terminal board 109 provides a convenient means for monitoring the input to the differential amplifier and may be used as an output in a dynamoelectric system that has other threshold circuitry available.

Referring now to FIG. 4, there is shown a drawing of signals at various points in the system in timed relationship wherein the filtered and clipped input to the gating circuit is shown in FIG. 4a with the gating period indicated in the interval designated sampling time. FIG. 4b shows the positive going output pulse of the second monostable multivibrator 27 which is the enabling pulse for the gating network 28. FIG. 4c shows the negative going output pulse of the first monostable multivibrator 24 which is shown differentiated in FIG. 4d with the positive going spike 205 being used to trigger the second monostable multivibrator 27.

OPERATION

The RC filter in the positive brush monitoring branch containing elements 50, 51, 52 and 53, and the RC filter network in the negative brush monitoring branch containing elements 54, 55, 56 and 57 pass only the higher frequency components of the signals picked up from brushes 18 and 19 and which signals are represented in FIG. 5. A portion of the partly filtered signal is picked up at point 58 and passed through a coupling capacitor 59 to a negatively biased clipping circuit consisting of resistors 60 and 61 and a negatively, slightly forward biased zener diode 62. Because of the polarity of zener diode 62, all of the negative portion of the signal is shunted to ground and because of the negative bias applied to zener diode 62 a portion of the positive signal is also shunted to ground. The more positive portion of the input signal, mainly the positive going noise spike, is fed to the base of the transistor 63 until the amplitude of the positive going noise spike exceeds the breakdown voltage of zener diode 62. The emitter-follower composed of transistor 63 and resistor 64 amplifies this positive spike and serves to isolate the clipping circuit from the first monostable multivibrator 24.

The operation of the monostable multivibrator is conventional and well known and it is felt unnecessary to describe its operation in detail here; however, suffice it to say that the monostable multivibrator produces a single substantially rectangular pulse output in response to each trigger pulse and the width of this rectangular pulse is determined substantially by the RC time constant of resistor 74 and capacitor 73. The main function of the first monostable multivibrator 24 is to provide a delay before triggering the second monostable multivibrator 27, and since the width of the noise spike and the resulting ringing after a noise spike may vary depending upon the loading of the circuit producing the noise spikes, it may be necessary to adjust the amount of this delay. The length of this delay is determined by the output pulse width of the first monostable multivibrator 24, and this adjustment may be made by varying the values of the resistor 74 and capacitor 73 since the time constant of this RC network is the product of these two values and the pulse width of the output pulse is directly proportional to this RC time constant. The output pulse of the emitter-follower developed across resistor 64 triggers the monostable multivibrator which produces a negative going output pulse, as shown in FIG. 4c, at the collector of transistor 66 which in turn is differentiated by capacitor 77 nd resistor 78 producing a negative going output pulse 206 in response to the leading pulse edge and a positive going pulse 205 in response to the trailing edge of the pulse of the first monostable multivibrator 24, which is illustrated in FIGS. 4c–4d. Diode 26 passes only the positive going pulse 205 in response to the trailing edge of the first monostable output pulse which is developed across resistor 79 and applied to the base of transistor 80 which triggers the second monostable multivibrator 27. The operation of the second monostable multivibrator 27 is also well known and it is not deemed necessary to describe it in detail here except to say that capacitor 87 and resistor 88 substantially control the duration of the output pulse which in turn controls the length of the gating or sampling interval. The output pulse of monostable multivibrator 27, illustrated in FIG. 4b, is taken from the collector 89 of transistor 81 and fed through an isolation network composed of the parallel combination of capacitor 91 and resistor 92 to the base 93 of transistor 90 in gating network 28, and functions as a gating or enabling signal.

Simultaneously, while the gating signal was being generated in the gating control circuitry, the outputs of the RC filter networks, containing elements 50, 51, 52 and 53 and elements 54, 55, 56 and 57, were passed respectively through resistors 95 and 96 to clipping circuits composed of zener diodes 97, 98 and 99, 100, respectively. The clipping circuits in the positive and negative brush branches are identical and therefore only one will be discussed. The zener diodes 97 and 98 are oppositely poled, series connected between the signal line 158 and ground. The result of the oppositely poled, series connected zener diodes is that for either polarity of signal one zener diode will be forward biased and the other zener diode conducts when the amplitude of the signal exceeds its breakdown voltage. The filtered and clipped signal, as shown in FIG. 4a, is then fed through slightly forward biased diode 101 to the base 103 of transistor 104 connected in an emitter-follower configuration. Diode 101 receives its positive bias from the B+ bus line through resistors 95 and 105. The function of diodes 101 and 102 is to insure that signals in the two branches do not cancel one another due to instantaneous phase variations and to insure that the stronger of the two is always sensed on the base 103 of transistor 104, and to provide protection for the base circuit of transistor 104. The output of the emitter-follower which contains both limited noise spikes and the information signal to be monitored is developed across resistor 107 and is fed through the jumpered A and B terminals of terminal board 109 to the base 108 of transistor 94.

Gating network 28 eliminates the noise spike from the signal and passes a signal only at predetermined time after the occurrence of a noise spike determined by the pulse width of monostable multivibrator 24 for an interval of time determined by the pulse width of multivibrator 27. The positive output pulse of monostable multivibrator 27 is applied to the base 93 of transistor 90 thereby causing transistor 90 to become nonconductive during this interval. When monostable multivibrator 27 is in its quiescent state, its output level causes transistor 90 to be highly conductive thereby shorting the emitter-collector circuit of transistor 94 resulting in the loss of output signal from the gating network 28. Diodes 110 and 111 are used to protect the emitter circuits of and for biasing of transistors 94 and 93, respectively. The output signal of the gating network 28 is developed across resistor 112 during the gating or sampling interval and is normally fed through the jumpered terminals C and D of terminal board 109 to the base 113 of transistor 114.

Transistor 114 is connected in an emitter-follower configuration with its output developed across resistor 115 which is fed through resistor 116 to a peak integrating circuit composed of diode 117, capacitor 118 and resistor 119. The peak integrating circuit functions similarly to a filtered half-wave rectifier producing a varying DC output signal in response to the gated varying input brush noise information signal which would be represented by the portion of the signal in FIG. 4a within the sampling time. This varying DC signal is then fed to the gate 120 of junction field effect transistor 121 which is connected in a source follower mode with the signal being developed across the parallel combination of resistor 122 and potentiometer 123 in the source circuit. The output of the source follower is taken through the wiper arm 125 of potentiometer 123 and is fed through an isolation resistor 126 to the base 127 of transistor 128.

Transistor 128 is connected in an emitter-follower configuration with resistor 133 and forward biased diodes 129, 130, 131 and 132 connected in series between the base 127 of transistor 128 and ground in order to provide thermal stability for the direct coupled amplifier by providing a shunt path for thermal current (Ico) of transistor 128. The diodes 129–132 and resistor 152 should be chosen so that the bias current of the diodes is essentially equal to the transistor thermal current (Ico) which will be shunted through these diodes in order to provide the thermal stability. The output of the emitter-follower is developed across resistor 134 and is fed through an isolation resistor 135 to both output terminal 0 on terminal board 109 and to the base 136 of transistor 137 located in differential amplifier 34.

A constant current is maintained through the differential amplifier 34 by the constantly biased transistor 139 connected in the emitter to ground circuits of transistors 137 and 138 of differential amplifier 34. A regulated presettable voltage is applied to the base 143 of transistor 138 through potentiometer 145 thereby allowing an output signal to be developed across resistor 151 only when the input on base 136 of transistor 137 exceeds the constant potential applied to base 143 of transistor 138. The output signal of the differential amplifier 34 developed across resistor 151 is applied to the base 152 of transistor 153, and this output signal causes transistor 153 to conduct when the input on base 136 of transistor 137 exceeds the preset voltage on base 143 of transistor 148 thereby causing relay coil 155 to be energized which in turn causes either the sounding of an alarm or the deenergization of the generator system by actuation of its relay contacts 156 and 157.

It will be apparent to those skilled in the art that the monitoring system described herein may be used for monitoring any signal which contains somewhat periodic undesired noise spikes. It is also apparent that various changes and modifications may be made in the circuitry, or different devices used to produce the same function in the circuit. For example, vacuum tubes or nuvistors could be used in place of the transistors, or a delay line could be used in place of the multivibrator used in producing a delay. Also other pulsing circuits such as a Schmitt trigger circuit could be used in producing the enabling pulse for the gating network instead of the second monostable multivibrator.

In view of the above, it will be apparent that modifications and variations are possible within the scope and spirit of the above teachings. It therefore is to be understood that within the scope of the appended claims the invention may be practiced other than as specifically described.

What is claimed as new and desired to be secured by Letters Patent of the United States is:

1. Apparatus for monitoring a composite signal including an information signal and recurring noise spikes, comprising:
   an information signal path, a control signal path and gating means, said gating means including a first input, a second input and an output, means connecting said information signal path to said first input of said gating means, means connecting said control signal path to said second input of said gating means;
   said control signal path including means for producing a triggering pulse in response to a noise spike exceeding a preselected amplitude, delay means for delaying said triggering pulse, and a pulse forming means triggered by said delayed triggering pulse to produce an enabling signal; and
   said information signal path including means for routing a signal through said gating means, said gating means being enabled by said enabling signal to pass said information signal only during a preset interval at a predetermined time after the occurrence of a noise spike, and means to produce an output signal at the output of said gating means.

2. Apparatus for monitoring a composite signal as set forth in claim 1, said apparatus including peak integrating means on the output side of said gating means, said peak integrating means being provided with an input and an output, the output of said gating means being fed into said input of said peak integrating means to produce a signal at said output of said peak integrating means which is proportional to the amplitude of said information signal between noise spikes.

3. Apparatus for monitoring a composite signal as set forth in claim 2, including threshold means on the output side of said peak integrating means, said threshold means being provided with an input and an output, the signal at said output of said peak integrating means being fed into said input of said threshold means to produce a signal at said output of said threshold means only when said signal at said input of said threshold means exceeds a predetermined level.

4. Apparatus for monitoring a composite signal as set forth in claim 3, including an alarm means activated by a signal at said output of said threshold means when a signal at said output of said peak integrating means exceeds a predetermined level.

5. Apparatus for monitoring a composite signal including an information signal and recurring noise spikes, comprising:
   a filter means provided with an input and an output;
   an information signal path, a control signal path and gating means, said gating means including a first input, a second input and an output, means connecting said information signal path to said first input of said gating means, means connecting said control signal path to said second input of said gating means;
   said filter means including means for receiving said composite signal at said input of said filter means, means for removing undesired frequency components of said composite signal and means for delivering the output of said filter means to both said information signal path and said control signal path;
   said control signal path including means for producing a triggering pulse in response to a noise spike exceeding a preselected amplitude, delay means for delaying said triggering pulse, and a pulse forming means triggered by said delayed triggering pulse to produce an enabling signal; and
   said information signal path including means for routing a signal through said gating means, said gating means being enabled by said enabling signal to pass said information signal only during a preset interval at a predetermined time after the occurrence of a noise spike, and means to produce an output signal at the output of said gating means.

6. Apparatus for monitoring a composite signal as set forth in claim 5, said apparatus including peak integrating means on the output side of said gating means, said peak integrating means being provided with an input and an output, the output of said gating means being fed into said input of said peak integrating means to produce a signal at said output of said peak integrating means which is proportional to the amplitude of said information signal between noise spikes.

7. Apparatus for monitoring a composite signal as set forth in claim 6, including threshold means on the output side of said peak integrating means, said threshold means being provided with an input and an output, the signal at said output of said peak integrating means being fed into said input of said threshold means to produce a signal at said output of said threshold means only when said signal at said input of said threshold means exceeds a predetermined level.

8. Apparatus for monitoring a composite signal as set forth in claim 7, including an alarm means activated by a signal at said output of said threshold means when a signal at said output of said peak integrating means exceeds a predetermined level.

9. Apparatus for monitoring a composite signal including an information signal and recurring noise spikes, comprising:
a filter means provided with an input and an output;
an information signal path, a control signal path and gating means, said gating means including a first input, a second input and an output, means connecting said information signal path through said first input of said gating means, means connecting said control signal path to said second input of said gating means;
said filter means including means for receiving said composite signal at said input of said filter means, means for removing undesired frequency components of said composite signal and means for delivering the output of said filter means to both said information signal path and said control signal path;
said control signal path including clipping and biasing means for passing only a portion of a noise spike exceeding a preselected amplitude, means for producing a triggering pulse in response to said portion of a noise spike, a first pulse forming means controllable by said triggering pulse to produce an output pulse, a second pulse forming means, and means for causing said second pulse forming means to be triggered on the trailing edge of the output pulse formed by said first pulse forming means to produce an enabling signal; and
said information signal path including means for routing a signal through said gating means, said gating means being enabled by said enabling signal to pass said information signal only during a preset interval at a predetermined time after the occurrence of a noise spike, and means to produce an output signal at the output of said gating means.

10. Apparatus for monitoring a composite signal as set forth in claim 9, said apparatus including peak integrating means on the output side of said gating means, said peak integrating means being provided with an input and an output, the output of said gating means being fed into said input of said peak integrating means to produce a signal at said output of said peak integrating means which is proportional to the amplitude of said information signal between noise spikes.

11. Apparatus for monitoring a composite signal as set forth in claim 10, including comparator means provided with a first input, a second input and an output, said first input of said comparator means being supplied with a preset voltage, said second input of said comparator means being supplied with the signal at said output of said peak integrating means to produce a signal at said output of said comparator means only when said signal at said second input of said comparator means exceeds said preset voltage at said first input of said comparator means.

12. Apparatus for monitoring a composite signal as set forth in claim 11 where said comparator means is a differential amplifier.

13. Apparatus for monitoring a composite signal as set forth in claim 12, including an alarm means activated by a signal at said output of said comparator means when a signal at said second input of said comparator means exceeds said preset voltage at said first input of said comparator means.

14. Apparatus for monitoring a composite signal including an information signal and recurring noise spikes, comprising:
a filter means provided with an input and an output;
an information signal path, a control signal path and gating means, said gating means including a first input, a second input and an output, means connecting said information signal path through said first input of said gating means, means connecting said control signal path to said second input of said gating means;
said filter means including means for receiving said composite signal at said input of said filter means, means for removing undesired frequency components of said composite signal delivered at said input of said filter means, and means for delivering the output of said filter means to both said information signal path and said control signal path;
said control signal path including clipping and biasing means for passing only a portion of a noise spike exceeding a preselected amplitude, means for producing a triggering pulse in response to said portion of a noise spike, a first pulse forming means controllable by said triggering pulse to produce an output pulse, a second pulse forming means, and means for causing said second pulse forming means to be triggered on the trailing edge of the output pulse formed by said first pulse forming means to produce an enabling signal; and
said information signal path including a second clipping means to limit noise spikes above and below predetermined levels, and means for routing a signal through said gating means, said gating means being enabled by said enabling signal to pass said information signal only during a preset interval at a predetermined time after the occurrence of a noise spike, and means to produce an output signal at the output of said gating means.

15. Apparatus for monitoring a composite signal as set forth in claim 14 wherein said first and second pulse forming means are monostable multivibrators.

16. Apparatus for monitoring a composite signal as set forth in claim 14, said apparatus including peak integrating means on the output side of said gating means, said peak integrating means being provided with an input and an output, the output of said gating means being fed into said input of said peak integrating means to produce a signal at said output of said peak integrating means which is proportional to the amplitude of said information signal between noise spikes.

17. Apparatus for monitoring a composite signal as set forth in claim 16, including comparator means provided with a first input, a second input and an output, said first input of said comparator means being supplied with a preset voltage, said second input of said comparator means being supplied with the signal at said output of said peak integrating means to produce a signal at said output of said comparator means only when said signal at said second input of said comparator means exceeds said preset voltage at said first input of said comparator means.

18. Apparatus for monitoring a composite signal as set forth in claim 17, including an alarm means activated by a signal at said output of said comparator means when a signal at said second input of said comparator means exceeds said preset voltage at said first input of said comparator means.

* * * * *